(12) United States Patent  (10) Patent No.: US 8,843,230 B2
Mizuno et al.  (45) Date of Patent: Sep. 23, 2014

(54) MACHINING TIME PREDICTING APPARATUS OF NUMERICALLY CONTROLLED MACHINE TOOL

(75) Inventors: Tohru Mizuno, Minamitsuru-gun (JP); Takuji Chiba, Minamitsuru-gun (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 671 days.

(21) Appl. No.: 13/188,485

(22) Filed: Jul. 22, 2011

(65) Prior Publication Data

US 2012/0109359 A1   May 3, 2012

(30) Foreign Application Priority Data

Oct. 27, 2010 (JP) ................................ 2010-241060

(51) Int. Cl.
*G06F 19/00* (2011.01)
*G05B 19/418* (2006.01)

(52) U.S. Cl.
CPC *G05B 19/41865* (2013.01); *G05B 2219/31407* (2013.01); *G05B 2219/36219* (2013.01); *G05B 2219/31429* (2013.01); *G05B 2219/37336* (2013.01)
USPC ........................ 700/173; 700/159; 318/568.17

(58) Field of Classification Search
USPC ........................ 700/175, 173, 160, 159, 178; 318/568.1; 409/48, 31; 451/11, 150
See application file for complete search history.

(56) References Cited

U.S. PATENT DOCUMENTS

| | | | | |
|---|---|---|---|---|
| 4,104,688 A * | 8/1978 | Pecsi | ............................... | 361/28 |
| 4,789,931 A * | 12/1988 | Kuragano et al. | ............. | 700/176 |
| 4,965,737 A * | 10/1990 | Iwagaya | ........................ | 700/180 |
| 5,289,383 A * | 2/1994 | Sawamura et al. | ........... | 700/187 |
| 6,728,657 B2 * | 4/2004 | Nakamura | .................... | 702/178 |
| 7,070,368 B2 * | 7/2006 | Murakami et al. | .............. | 409/84 |
| 7,167,772 B2 * | 1/2007 | Hioki et al. | ................... | 700/189 |
| 7,331,739 B2 * | 2/2008 | Yoshida et al. | ............... | 409/131 |
| 7,847,506 B2 * | 12/2010 | Ogawa | .......................... | 318/574 |
| 8,024,068 B2 * | 9/2011 | Gray | .............................. | 700/252 |
| 8,478,438 B2 * | 7/2013 | Nishibashi | .................... | 700/159 |
| 2003/0118416 A1 * | 6/2003 | Murakami et al. | ............ | 409/132 |

FOREIGN PATENT DOCUMENTS

| | | |
|---|---|---|
| CN | 1934512 A | 3/2007 |
| CN | 1971457 A | 5/2007 |
| JP | 2003330517 A | 11/2003 |
| JP | 2005-301440 | 10/2005 |
| JP | 2006-227701 A | 8/2006 |
| JP | 2007-25945 | 2/2007 |
| JP | 2007-94936 | 4/2007 |
| JP | 2007-279899 A | 10/2007 |
| JP | 2009-98981 | 5/2009 |

\* cited by examiner

*Primary Examiner* — Kidest Bahta
(74) *Attorney, Agent, or Firm* — Drinker Biddle & Reath LLP

(57) ABSTRACT

A machining time predicting apparatus of a numerically controlled machine tool divides a tool path into a plurality of segments, obtains a speed in a tangential direction of each of the divided segments, calculates a time taken for the tool to move on each segment, and obtains the total of the calculated times taken for the tool to move on each segment as a tool moving time, in order to calculate a time (tool moving time) taken for the tool to move on the designated tool path according to an NC command.

5 Claims, 6 Drawing Sheets

MACHINING TIME PREDICTING APPARATUS OF NUMERICALLY CONTROLLED MACHINE TOOL

RELATED APPLICATION DATA

This application claims priority under 35 U.S.C. §119 and/or §365 to Japanese Application No. 2010-241060 filed Oct. 27, 2010, the entire contents of which is incorporated herein by reference.

BACKGROUND OF THE INVENTION

1. Field of the Invention

The present invention relates to a machining time predicting apparatus of a numerically controlled machine tool, the apparatus calculating a time taken for a tool to move on a designated path according to a NC (numerical control) command.

2. Description of the Related Art

To predict beforehand a processing time by a numerically controlled machine tool is important for efficiently operate the machine tool. In order to predict the processing time, a user has to know a moving speed of a tool. A method described below has been known as a method of predicting an actual moving speed of a tool.

Japanese Patent Application Laid-Open (JP-A) No. 2007-25945 describes a technique described below. Specifically, in this technique, a database of a speed control parameter, which is set according to at least either one of a type of a processing machine and a machining mode, is made. NC data (NC command) having a program of moving command data is input to a processing time predicting module. The speed control parameter according to the selected type of the processing machine or the machining mode is read from the processing time predicting module, and the processing time is predicted based upon the read speed control parameter and the moving command.

JP-A No. 2009-98981 describes a technique described below. Specifically, in this technique, a divided trajectory that is obtained by dividing a trajectory of a tool into a small section. The tool is moved on the divided trajectory with a speed according to the designated moving speed so as to process a workpiece. A tool position at an optional position on the divided trajectory when the tool is moved as described above and a temporal change of the moving speed of the tool in each axial direction on each of the divided trajectories are obtained as axis control data. A processing time is calculated from the temporal change of the moving speed in each axial direction designated by the obtained axis control data.

JP-A No. 2005-301440 describes a technique described below. Specifically, in this technique, a movement trajectory designated to a machine tool in an axis moving command is interpolated with the same interpolation algorithm as that for driving an NC machine tool (numerically controlled machine tool). The number of times of the interpolation of the movement trajectory designated by the axis moving command is counted, wherein an axis moving time in the axis moving command is calculated by multiplying an interpolation period upon driving and controlling the NC machine tool by the counted number of times of the interpolation.

As described above, a user has to know a moving speed of a tool in order to predict a processing time. However, the actual speed of the tool during machining is different from the speed obtained by applying the acceleration and deceleration, which are set to the CNC parameter, to the designated speed given by an NC command.

The current CNC controls the moving speed of the tool with a very short period in order to suppress shock to a machine and to realize a smooth movement of the tool. Therefore, the moving speed of the tool in a tangential direction along a tool path momentarily changes. Accordingly, in the method of changing the speed in a block unit as described in JP-A No. 2007-25945, an effect of the speed that changes in a unit time shorter than the block length cannot be taken.

In a process that takes time such as die machining, it is important that a time (processing time) taken for the prediction is short, in addition to the precision of the predicted machining time. The technique described in JP-A No. 2009-98981 takes time for a calculation, because the movement of the tool is divided into an operation for each axis in order to use speed data for every axis. Therefore, this technique takes much processing time. The technique described in JP-A No. 2005-301440 utilizes the interpolation process of the CNC. Therefore, most of the functions of the CNC, i.e., from the reading of the NC command to the interpolation, are to be executed, whereby it is impossible to drastically shorten the processing time compared to an actual machining.

SUMMARY OF THE INVENTION

Therefore, in view of the above-described disadvantage of the related art, it is an object of the present invention to provide a predicting method and a predicting apparatus of a machining time by a numerically controlled machine tool, which can enhance a precision of the prediction of the machining time and can shorten the time for predicting the machining time.

The machining time predicting apparatus of a numerically controlled machine tool according to the present invention calculates a time taken for a tool to move on a designated tool path according to an NC command. The machining time predicting apparatus includes a tool path dividing unit that divides the tool path into a plurality of segments; a speed calculating unit that acquires a speed in a tangential direction of each of the divided segments divided by the tool path dividing unit; a segment moving time calculating unit that calculates a time taken for the tool to move on each segment based upon the speed in the tangential direction acquired by the speed calculating unit; and a tool moving time calculating unit that acquires the total time, taken for the tool to move on each segment, calculated by the segment moving time calculating unit, as the time taken for the tool to move on the designated tool path.

According to the configuration described above, the time taken for the machining can more accurately be predicted than in the related art. Therefore, the time taken for a user to use a machine in an individual machining can be grasped beforehand in more detail, whereby the time when the machine is not used can be reduced to attain an efficient operation. Further, since the time up to the end of the machining can more accurately be predicted than in the related art, a production schedule can properly be set.

The tool path dividing unit acquires the speed of the tool by multiplying the designated speed according to the NC command by a predetermined coefficient, or a coefficient determined based upon a curvature of the tool path. The tool path dividing unit also divides the tool path in a predetermined time interval, supposing that the tool moves with the obtained speed, and specifies each of the divided sections as a segment. The predetermined time interval for dividing the tool path can be variable. With this, the processing time can be obtained, not only when a workpiece is processed with the designated speed according to the NC command, but also when an override is set. Further, the machining time can be shortened according to the balance of the precision in the predicted value of the machining time.

The speed calculating unit is a unit that calculates the speed in the tangential direction of the segment from a starting point to a terminal of the segment. The speed calculating unit can include a terminal speed calculating unit that determines the speed at the terminal of each segment based upon at least one of a speed difference, acceleration difference, and a jerk difference between the adjacent segments, the curvature of the tool path, and the number of the segments used for the calculation of the speed; a tangential-direction acceleration calculating unit that sets the acceleration in the tangential direction of the segment as the maximum value by which a component in a direction of an axis driven by the NC command does not exceed the maximum acceleration of each axis; an upper limit speed calculating unit that compares a value obtained by multiplying the designated speed by a predetermined coefficient with a predetermined value based upon the curvature of the tool path so as to decide the upper limit speed of the segment; and a speed curve calculating unit that calculates a speed curve, which is a speed in the tangential direction of the segment, by using the acceleration in the tangential direction obtained by the tangential-direction acceleration calculating unit, in such a manner that the speed does not exceed the upper limit speed decided by the upper limit speed calculating unit and the speed at the terminal of the segment does not exceed the speed obtained by the terminal speed calculating unit. With this, the machining time can accurately be predicted, even when the speed control due to the speed, acceleration, jerk, and the curvature of the tool path is made.

The speed curve calculating unit selects one of a plurality of speed calculating units prepared beforehand, and can calculate the speed curve by the selected calculating unit. With this, the machining time can be shortened according to the balance of the precision in the predicted value of the processing time.

According to the configuration described above, the present invention can provide a predicting apparatus of a machining time by a numerically controlled machine tool, which can enhance a precision of the prediction of the machining time and can shorten the time for predicting the processing time.

BRIEF DESCRIPTION OF THE DRAWINGS

The aforementioned and other objects and features of the present invention will be apparent from the following description of embodiments with reference to the accompanying drawings in which.

DETAILED DESCRIPTION OF THE PREFERRED EMBODIMENTS

In the present invention, a tool path is divided into a plurality of segments. A speed curve indicating a change of a speed in a tangential direction is obtained from a starting point to a terminal of each segment. A time taken for the tool to move on the segment is calculated, supposing that the tool moves in accordance with the obtained speed curve. The time taken for the tool to move on the whole tool path can be given as a total of the moving times of the respective segments.

The speed curve is obtained by taking into consideration a restriction for the speed determined based upon a speed difference, acceleration difference, and a jerk difference between the adjacent segments, the curvature of the tool path, and the number of the segment data used for the calculation of the speed. Accordingly, the precision of the calculated processing time can be enhanced.

According to the present invention, the movement of the tool is not divided into an operation for each axis, but can be handled as a one-dimensional problem involved with the speed in the tangential direction, whereby the processing time can be shortened. Since the interval of the division into each segment is variable, the predicted value of the moving time and the adjustment of the precision of the predicted value are made possible.

Figure 1:
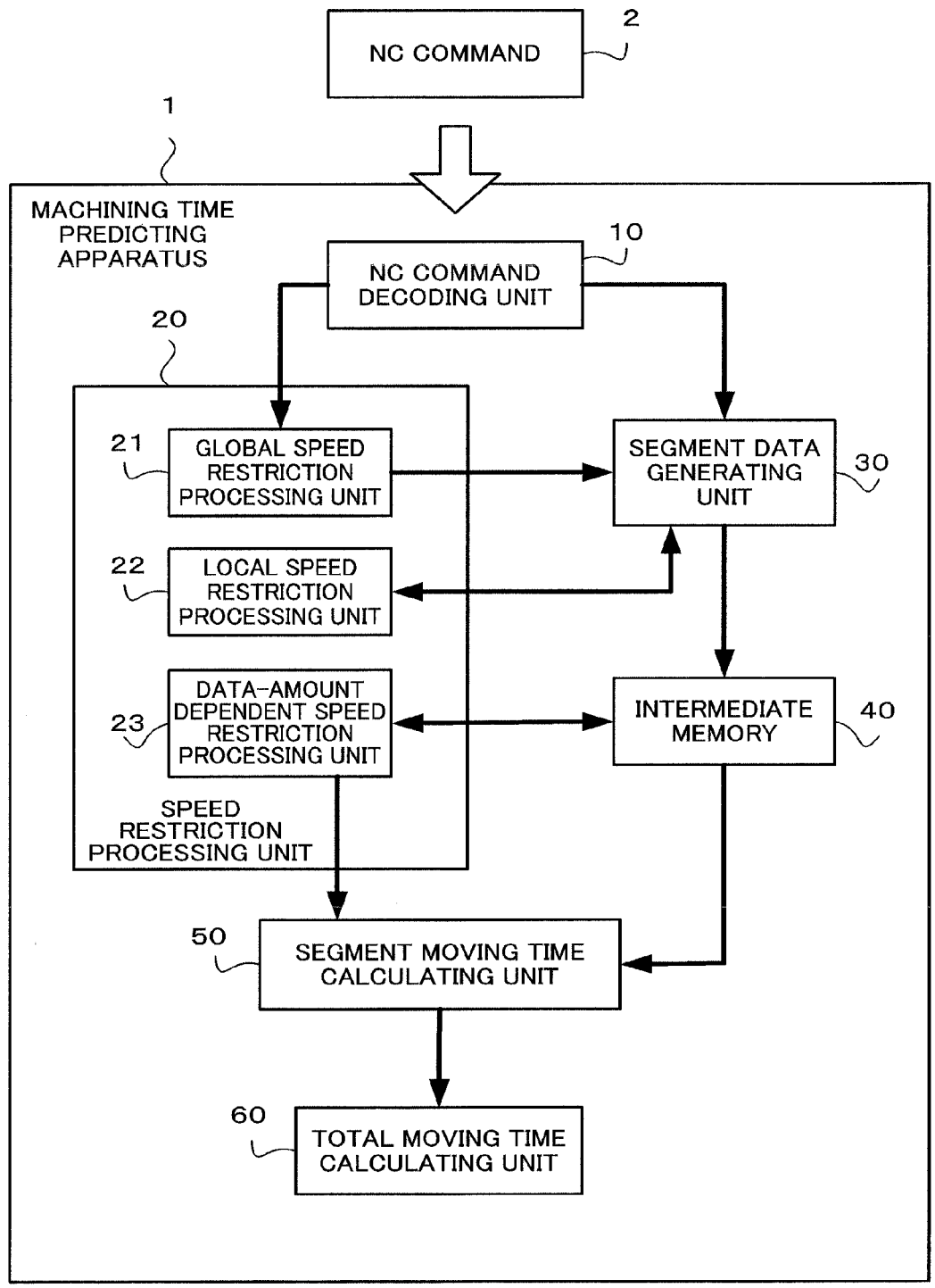
FIG. 1 is a functional block diagram of a machining time predicting apparatus.

FIG. 1 is a block diagram illustrating one embodiment of the present invention. A machining time predicting apparatus 1 includes an NC command decoding unit 10, a speed restriction processing unit 20, a segment data generating unit 30, an intermediate memory (buffer memory) 40, a segment moving time calculating unit 50, and a total moving time calculating unit 60.

The NC command decoding unit 10 receives an NC command (machining program) 2 as an input, and decodes the content of the command so as to divide the command into command data for every block written in the NC command (machining program) 2 to generate block data. The input NC command 2 is the same as that input to a CNC (numerically controlled apparatus). Any form such as a text file or binary data stored in a program memory of the CNC is applicable.

The block data generated by the NC command decoding unit 10 indicates a command content of each block constituting the original NC command (machining program) 2. The block data includes information on positions at a starting point and a terminal of the block, information on a type (straight line, arc, etc.) of a path from the starting point to the terminal of the block and information for determining the path (the central point of an arc, for example, and speed information of a tool when the tool moves in the block.

The speed restriction processing unit 20 includes a global speed restriction processing unit 21, a local speed restriction processing unit 22, and a data-amount dependent speed restriction processing unit 23.

The global speed restriction processing unit 21 compares a designated speed Vc designated by the NC command (machining program 2) with a speed Via determined beforehand according to the curvature of the tool path, and sets the smaller one as an upper limit value Vlim. The data of the designated speed Vc and the data of the curvature of the tool path are given from the block data generated by the NC command decoding unit 10. The data of the speed Via determined beforehand according to the curvature of the tool path is stored in a memory (not illustrated). When the moving time of the tool is calculated in case where an override is set, a speed obtained by multiplying the designated speed Vc by an override ratio is used, instead of the designated speed Vc.

The local speed restriction processing unit 22 and the data-amount dependent speed restriction unit 23 utilize segment data, so that they will be described later.

The segment data generating unit 30 receives the block data generated by the NC command decoding unit 10 so as to divide the tool path from the starting point to the terminal of each block into a plurality of segments. The method of dividing the tool path is as stated below. Specifically, a division speed Vd is obtained by multiplying the designated speed Vc by a predetermined coefficient k (or a coefficient determined based upon the curvature of the tool path). A distance (=Vd× τ) obtained by multiplying the obtained division speed Vd by a predetermined time τ is specified as a division interval, wherein the segment is sequentially cut to be formed from the starting point of the block with this division interval. When the length of each segment generated as described above is defined as L, an equation of L=Vd×τ is established. The predetermined time τ is an interpolation period or a time longer than the interpolation period.

A formed small segment is accumulated (stored) in the intermediate memory (buffer) 40 as segment data. The segment data accumulated in the intermediate memory 40 includes the length L of the segment, the direction (vector from the starting point toward the terminal) of the segment, the upper limit speed, and a corner speed Vr obtained by the local speed restriction processing unit 22.

The local speed restriction processing unit 22 obtains, for the segments generated by the segment data generating unit 30, the maximum speed, among the speeds in which the speed difference, the acceleration difference, and the jerk difference between the adjacent segments fall within a permissible value set beforehand, and specifies this speed as the corner speed Vr at a joint between the adjacent segments. The curvature of the tool path may be considered by the local speed restriction processing unit 22, instead of the global speed restriction processing unit 21. The segment data in which the value are set as described above is accumulated (stored) in the intermediate memory (buffer) 40.

The data-amount dependent speed restriction processing unit 23 takes into consideration the restriction for the moving speed of the tool determined by the number of the segment data pieces so as to enhance the accuracy of the calculated processing time. The data-amount dependent speed restriction processing unit 23 is provided for reconstructing the determination of the restriction to the speed by the number of data pieces read by a prefetch processing unit, as described in JP-A No. 2007-94936, in the machining time predicting apparatus.

The data-amount dependent speed restriction processing unit 23 forms a speed curve U(t), which indicates the speed change, referred to as a deceleration curve, toward the segment at the head in the intermediate memory (buffer) 40, supposing that a predetermined speed Ua is attained at the terminal of the last segment (the last-generated segment) accumulated in the intermediate memory (buffer) 40. Since the tool cannot move with a speed not less than the speed curve U(t), the speed curve U(t) is referred to as a permissible speed. A predetermined speed Ua is set to be 0, in general, but it may be a finite value.

Figure 2:
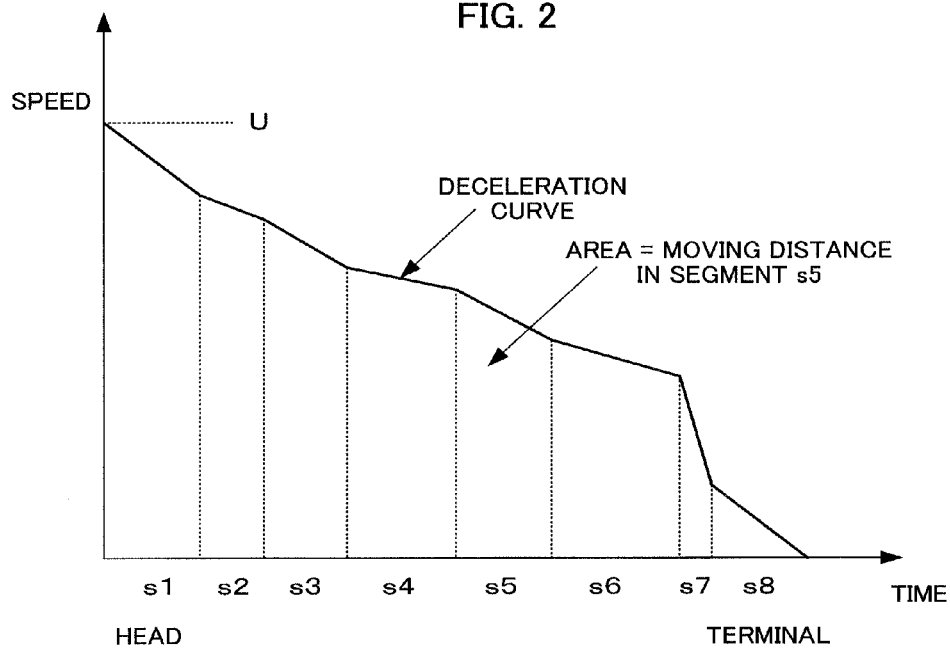
FIG. 2 is a view for describing how to obtain a deceleration curve.

FIG. 2 illustrates one example of the deceleration curve. In FIG. 2, s1 and s8 respectively represent the head segment and the last segment accumulated in the intermediate memory (buffer) 40. In the example in FIG. 2, the segment s8 is the last-generated segment of the segments s1 to s8. In this case, the deceleration curve is formed toward the head segment s1 such that the predetermined speed Ua becomes 0 at the terminal of the last segment s8.

The slope of the deceleration curve represents a magnitude of an acceleration α in the tangential direction. The area of the columnar region, which is cut by the deceleration curve and a dotted line indicating the starting point and the terminal of each segment is equal to the moving distance (L=Vd×τ) of this segment.

The acceleration α in the tangential direction is set to be the maximum value that does not exceed the permissible acceleration of each axis, when the acceleration is resolved into a component in the direction of a drive axis of the machine. Specifically, a limitation is imposed on the acceleration in the decelerating direction in order not to damage the machine due to a sharp deceleration. With respect to the head segment s1 (the earliest-generated segment) in the intermediate memory (buffer) 40, a speed Un, determined by the deceleration curve, at the terminal of the segment and the corner speed Vr are compared, and the smaller one is set as the speed Ue at the terminal of the segment.

Figure 3:
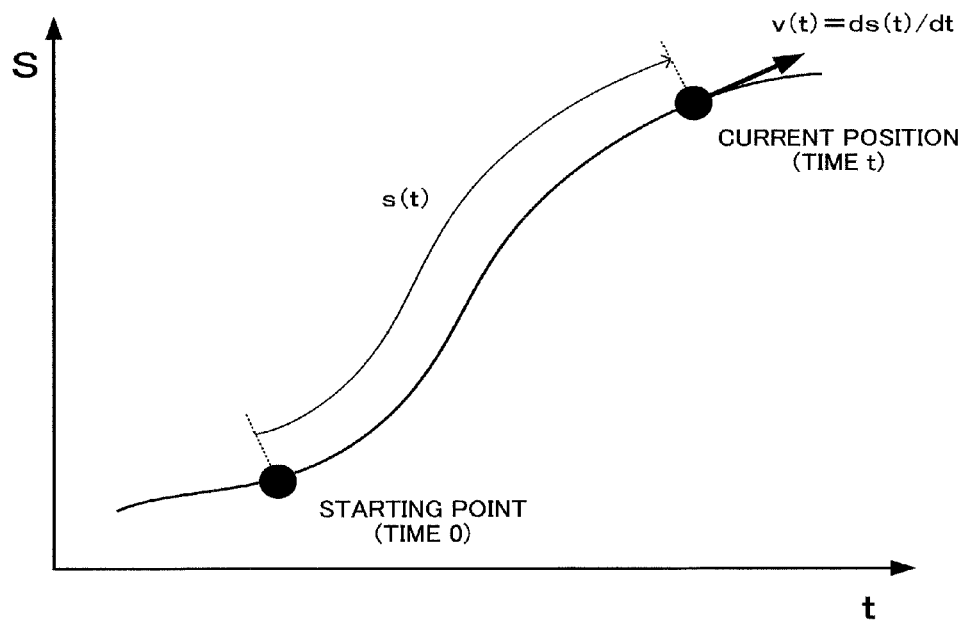
FIG. 3 is a view for describing a distance measured along a tool path and a tangential speed.

The segment moving time calculating unit 50 takes one of the segment data pieces from the intermediate memory (buffer) 40 so as to calculate the time taken for the tool to move in the segment. When the length of the segment is defined as L, the time at the starting point of the segment is defined as 0, and the speed curve that is the moving speed of the tool at a time t is defined as V(t), the time T taken for the tool to move in one optional segment satisfies an equation (1). The speed curve V(t) represents a time differentiation of a distance s(t) measured along the tool path as illustrated in FIG. 3.

$$\int_0^T V(t)dt = L \tag{1}$$

Figure 4:
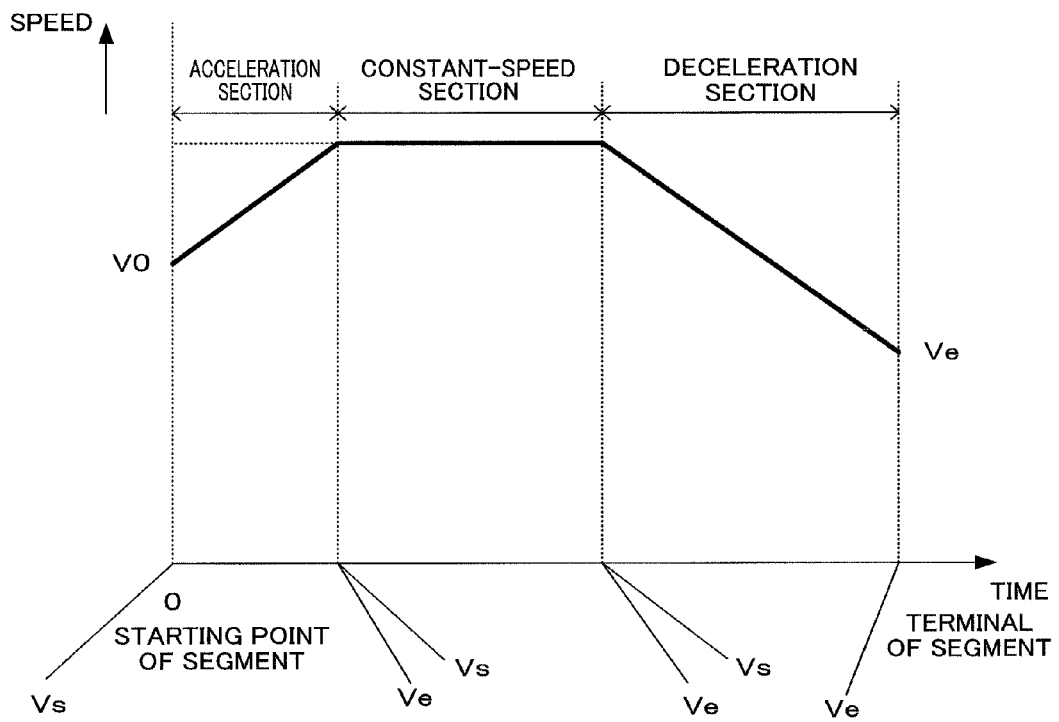
FIG. 4 is a view for describing a speed curve in a segment.

The speed curve V(t) that is the moving speed of the tool is supposed to be expressed by a first-degree equation for each section as illustrated in FIG. 4. In FIG. 4, there are an acceleration section, a constant-speed section, and a deceleration section in one segment. In FIG. 4, Vs and Ve respectively represent moving speeds of the tool at the starting point and the terminal of each section. V0 is a speed in the case of t=0, and it is a speed at the starting point of the segment. In the first segment (s1) from which the tool is started to move, the equation of V0=0 is established. In the subsequent segments, V0 is equal to the speed Ue at the terminal of the segment one before the current segment. The slopes of the acceleration section and the deceleration section are determined by the acceleration α in the tangential direction of the segment. Vlim is the upper limit speed obtained by the global speed restriction processing unit 21.

As illustrated in FIG. 4, the moving state of the tool is classified into an acceleration state in which the moving speed of the tool increases, a constant-speed state in which the tool moves at a constant speed, and a deceleration state in which the moving speed decreases. An evaluation function determined beforehand is used for the determination of the state to be realized (the actual moving state of the tool) and the transition of the state such as from the acceleration state to the constant-speed state.

The speed V0 at the starting point of the segment is determined as described above. Therefore, an initialization state at the starting point of the segment is determined, and the determination of the state transition and the update of the state due to the transition are performed, whereby the speed curve V(t) in the segment can be determined. When the speed curve V(t) is determined, the time T taken for the tool to move in one segment can be obtained by using the equation (1). FIG. 4 illustrates the case in which all of three states (acceleration state, constant-speed state, and deceleration state) appear in one segment. However, there are various forms of the speed change depending upon the condition. For example, there is the form in which only the acceleration state appears, or the form in which only the constant-speed state and the deceleration state appear (with no acceleration state).

The evaluation function that realizes the speed curve V(t) close to the actual speed of the tool is employed. For example, in the method of comparing the current permissible speed with the speed after the acceleration as described in JP-A No. 2007-94936, the value of the evaluation function W(t) at the time t is expressed by an equation (2) described below.

$$W(t)=U(t+\Delta t)-\{V(t)+\alpha\Delta t\} \quad (2)$$

Figure 5:
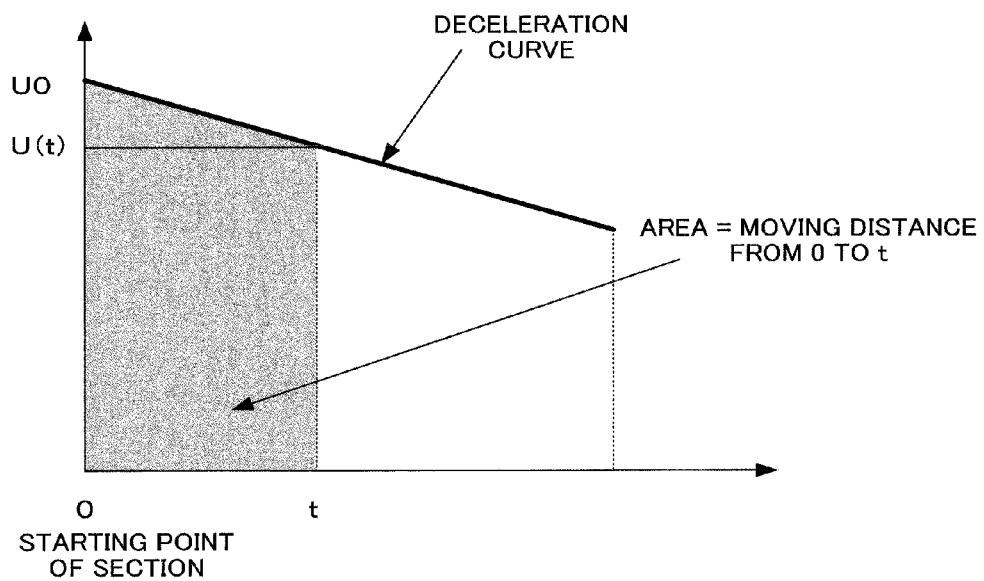
FIG. 5 is a view for describing how to obtain a permissible speed.

In the equation (2), it is determined that the acceleration is possible when the inequality of W(t)>0 is established. In the equation, V(t) represents the speed at the time t, α is the acceleration in the tangential direction, and U(t) represents the permissible speed at the time t determined based upon the deceleration curve. As illustrated in FIG. 5, the permissible speed U(t) is the speed indicated by the deceleration curve at the point where the tool moves up to the time t when the tool decelerates along the deceleration curve. Δt is a very small time, e.g., it is supposed to be 1 millisecond. The same is true for Δt in an equation described below.

Figure 6:
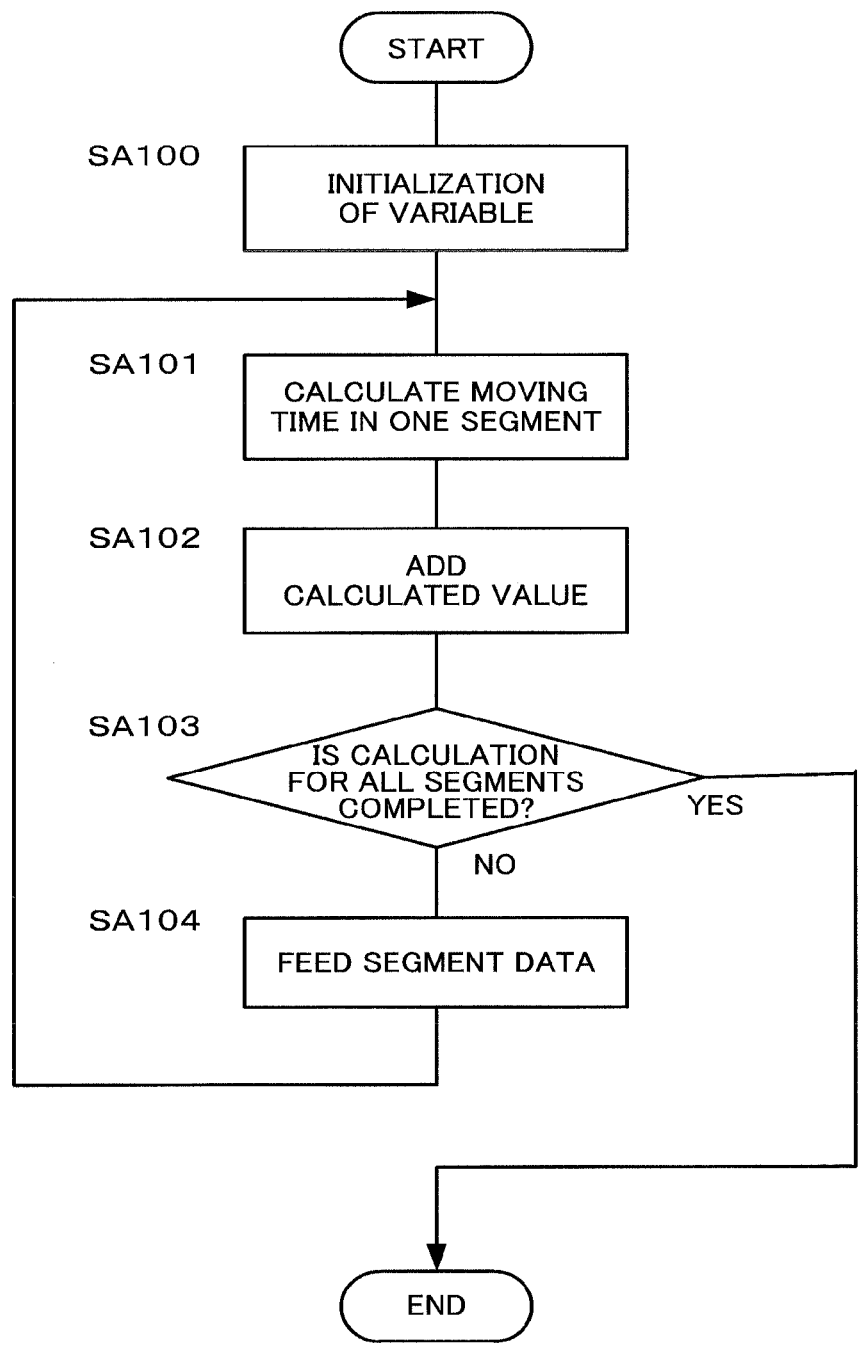
FIG. 6 is a flowchart illustrating a procedure of calculating a moving time of a tool by using segment data.
Figure 7:
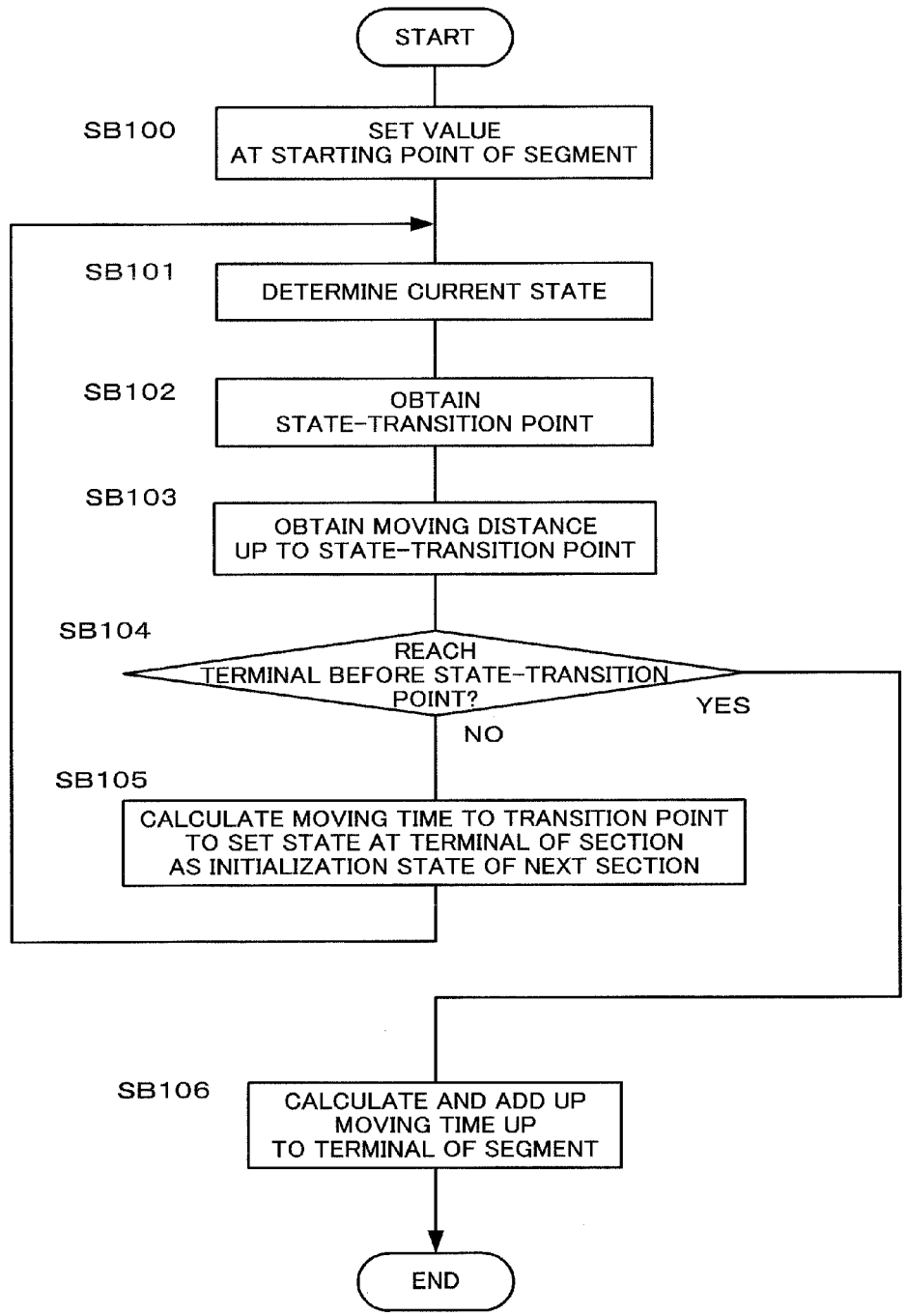
FIG. 7 is a flowchart illustrating a procedure of a calculation of a time taken for a tool to move in one segment.

FIG. 6 is a flowchart illustrating the procedure of calculating the moving time of the tool by using the segment data. FIG. 7 is a flowchart illustrating the procedure of calculating the time taken for the tool to move in one segment. The method of calculating the moving time of the tool will be described below with reference to these figures.

The process in FIG. 6 is started when the segment data in a predetermined number is generated, and fed to the intermediate memory (buffer) 40. The process will be described for respective steps as follows.

[Step SA100] An initialization of a variable is executed. Specifically, Ue that is the speed at the terminal of the previous segment is set to be 0, and a time T-total that is the time taken for the tool to move in the tool path formed of the plurality of segments is set to be 0.

[Step SA101] One segment data is taken out from the head of the buffer so as to calculate the time taken for the tool to move in the segment in accordance with the process shown in the flowchart of FIG. 7.

[Step SA102] The time calculated in the step SA101 is added to the time T-total.

[Step SA103] It is determined whether the calculation of the time (tool moving time) taken for the tool to move in all segments is completed or not. If not completed, the process proceeds to step SA104. If completed, the process is ended (specifically, the value of T-total in the step SA102 is taken as the time needed for the tool to move in the tool path).

[Step SA104] One segment data is generated, and fed to the buffer. Then, the process returns to the step SA101.

FIG. 7 is a flowchart for calculating the tool moving time in the step SA101 in FIG. 6. In this calculation method, the segment is divided into a plurality of sections according to the state, and the moving time of the tool is obtained for each divided section. The total of the moving times is specified as the time (segment moving time) taken for the tool to move in one segment. The variables representing the state described below are used. Vs: Speed at the starting point of the section, Ve: Speed at the terminal of the section, TIME: Moving time added from the starting point of the segment, Rd: Remaining distance of the segment.

The evaluation function is obtained by using an equation (3) described below. It is to be noted that V(t)+αΔt is clamped by the upper limit speed Vlim.

$$W(t)=U(t+\Delta t)-\{V(t)+\alpha\Delta t\} \quad (3)$$

The determination of the state is made according to the following conditions a) to c) described below.

a) in case of 0≤W(t), and V(t)<upper limit speed Vlim, it is determined to be an acceleration state.

b) in case of 0≤W(t) and V(t)=upper limit speed Vlim, it is determined to be a constant-speed state.

c) in the case of W(t)<0, it is determined to be a deceleration state.

The process will be described for respective steps as follows.

[Step SB100] A value at the starting point of the segment is set. Specifically, it is set such that Us=Ue (speed at the terminal of the previous segment), Rd=L (length of the segment), and TIME=0. Ue is initialized to be 0 at the first segment by the step SA100 in FIG. 6.

[Step SB101] The current state is determined according to the evaluation function W(t). The speed Vs at the starting point of the section, the permissible speed U0 at the starting point of the section obtained from the speed curve in FIG. 5, and the acceleration α in the tangential direction are substituted into the evaluation function, whereby the current state is determined by applying the determination condition described above.

[Step SB102] The point where the next state transition occurs is decided by using the evaluation function. For example, if the current state is the acceleration state, the calculation described below is made. When the time t has elapsed from the starting point of the section, the speed is expressed by an equation (4).

$$V=Vs+\alpha t \quad (4)$$

The permissible speed U(t) is obtained from an equation (5) described below.

$$(U0^2-U^2)/2\alpha=Vs*t+(\alpha/2)t^2 \quad (5)$$

A time T' up to the state-transition point is obtained from an equation (6). It is to be noted that, in the case of Vlim<Vs+αt, the t satisfying the equation of Vlim=Vs+αt is defined as the time T' up to the state-transition point.

$$W(T')=U(T'+\Delta t)-(Vs+\alpha T'+\alpha\Delta t)=0 \quad (6)$$

If the current state is the constant-speed state, the speed is Vlim. Therefore, the point where the permissible speed satisfies the equation of U(t)=Vlim is the state-transition point. When the elapsed time up to the state-transition point is defined as T', the distance that the tool moves up to the state-transition point is Vlim×T'. Therefore, an equation (7) is established.

$$(U0^2-U(T')^2)/2\alpha=Vlim\cdot T'tm \quad (7)$$

If the current state is the deceleration state, the speed at the terminal of the segment obtained by the local speed restriction processing unit 22 is defined as Ue, wherein the time T' up to the state-transition point satisfies an equation (8) described below. The speed is kept to be Ue after the tool reaches the state-transition point.

$$Vs-\alpha T'=Ue \quad (8)$$

[Step SB103] The distance that the tool moves from the starting point of the section to the state-transition point is calculated by using the time T' up to the state-transition point. In the case of the acceleration section, the distance is expressed by an equation (9) described below.

$$D=Vs*T'+\alpha*T'^2/2 \quad (9)$$

In the case of the constant-speed section, the distance is expressed by an equation (10) described below.

$$D = Vs*T'  \quad (10)$$

In the case of the deceleration section, the distance is expressed by an equation (11) described below.

$$D = Vs*T' - \alpha*T^2/2 \quad (11)$$

[Step SB104] It is determined whether the state-transition point is located before the terminal of the segment or not. If an inequality of Rd<D is established, the tool reaches the terminal of the segment before the tool reaches the state-transition point.

[Step SB105] The moving time up to the state-transition point is added to the TIME in the process in which the state-transition point is located before the terminal, and Vs and Rd are updated such that the state at the terminal of the current section becomes the starting point of the next section. Thereafter, the process returns to the step SB101 to repeat the process. When the speed at the terminal of the current section is defined as Ve, the updated values are Vs=Ve, and Rd=Rd−D.

[Step 55106] In the process in which the segment terminal is located before the state-transition point, the moving time Te from the starting point to the terminal of the section is added to the TIME, and then, the process is ended.

In the case of the acceleration section, the Te is obtained from an equation (12) described below.

$$Rd = Vs*Te + \alpha*Te^2/2 \quad (12)$$

In the case of the constant-speed section, the Te is obtained from an equation (13) described below.

$$Rd = Vs*Te \quad (13)$$

In the case of the deceleration section, the Te is obtained from an equation (14) described below.

$$Rd = Vs*Te - \alpha*Te^2/2 \quad (14)$$

According to the procedure described above, the moving times of the respective sections are added to the time, whereby the TIME holds the moving time of the segment at the point when the process is ended.

The total moving time calculating unit 60 sets the values held in the TIME as the total moving time.

In the description of one embodiment of the present invention, the acceleration in the tangential direction is made fixed from the starting point to the terminal of the segment. However, the speed calculating unit is not limited thereto. For example, when the acceleration α in the tangential direction depends upon the speed v, its relationship is linear that is α=v×h+k, and h and k are constants, an equation (15) described below is established.

$$V(t) = \left(\frac{1}{h}\right)\{(v_0 h + k)\exp(ht) - k\} \quad (15)$$

where v0 is an initial speed.

The integration of the equation (1) is analytically obtained. Therefore, the moving time of the tool can be obtained from the length L of the segment obtained from the equation (1) and the speed V(t) obtained from the equation (15).

For the division of the tool path into the segments, the distance (=Vd×τ) obtained by multiplying the division speed Vd, which is obtained by multiplying the designated speed Vc by the predetermined coefficient, by a predetermined time τ is used as the division interval. When the value of the "predetermined time τ" can be selected, the interval of the division is made variable. Since the processing time greatly relates to the number of the segments, the processing time can be shortened by increasing the interval of the division.

As described above, the evaluation function W(t) is used for the determination of the current motion state of the tool (acceleration/deceleration state, constant-speed state) and the determination of the state transition such as the transition from the acceleration state to the constant-speed state. However, the speed curve V(t) may be determined by using a technique employing an algorithm described below, not by using the above-mentioned evaluation function W(t).

It is supposed that the speed at the starting point of the segment is defined as V0, the speed at the terminal of the segment obtained by the local speed restriction processing unit 22 is defined as Ue, and the acceleration in the tangential direction is defined as α. Since the evaluation function W(t) is not used, the corner speed Vr obtained by the local speed restriction processing unit 22 is handled as the speed Ue at the terminal of the segment.

1) In the Case of V0≤Ue

The speed at the terminal of the segment when the speed is uniformly increased from the starting point to the terminal of the segment with the acceleration α in the tangential direction is defined as Vf.

Figure 8A:
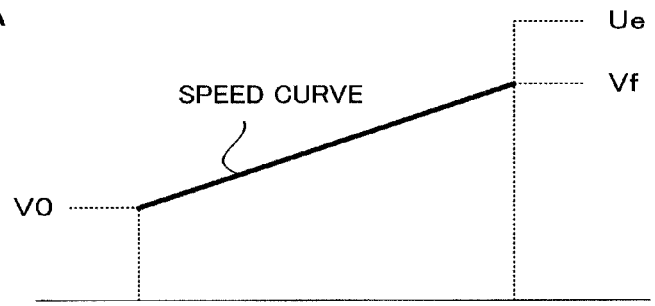
FIG. 8A to 8D are views for describing a second method for obtaining a speed curve.

In the case of Vf≤Ue: As illustrated in FIG. 8A, a straight line indicating that the speed uniformly increases with the acceleration α in the tangential direction is defined as the speed curve.

Figure 8B:
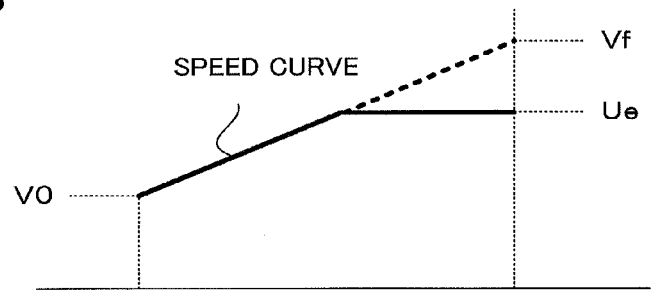

In the case of Ue<Vf: As illustrated in FIG. 8B, a polygonal line indicating that the speed is constant after reaching the Ue is defined as the speed curve.

2) In the case of Ue<V0

The speed at the terminal of the segment when the speed is uniformly decreased from the starting point to the terminal of the segment with the acceleration α in the tangential direction is defined as Vf.

Figure 8C:
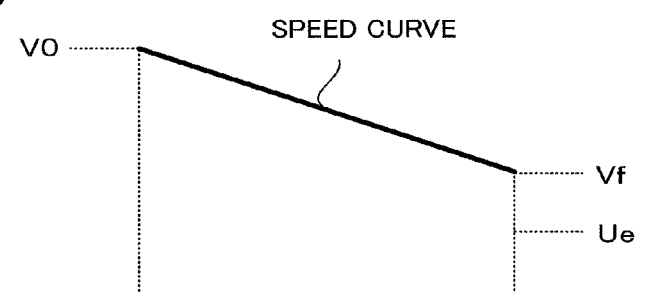

In the case of Ue≤Vf: As illustrated in FIG. 8C, a straight line indicating that the speed uniformly decreases with the acceleration α in the tangential direction is defined as the speed curve.

Figure 8D:
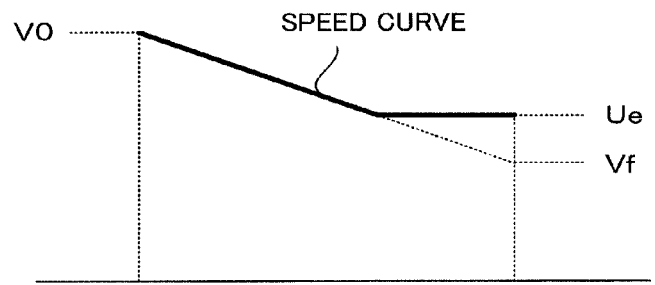

In the case of Vf<Ue: As illustrated in FIG. 8D, a polygonal line indicating that the speed is constant after reaching the Ue is defined as the speed curve.

A plurality of determination techniques described above are prepared, and one of them may be selected.

The evaluation function is not necessarily limited to the one employed in the present embodiment. Any other evaluation functions can be employed so long as they can approximately reproduce the speed determined according to the speed control of the CNC. The technique not using the evaluation function may be employed.

It is not necessary that the machining time predicting apparatus according to the present invention is an independent apparatus. It can be configured such that an apparatus having a function of predicting the processing time is mounted to the CNC, wherein the CNC itself can be used as the machining time predicting apparatus.

Although not clearly illustrated in FIG. 1, the apparatus may include an adding unit that adds a stop time when a command of stopping the tool is issued, and an auxiliary function execution time calculating unit. The auxiliary function execution time calculating unit is to calculate an execution time of a command other than the moving command, such as M code.

The invention claimed is:

1. A machining time predicting apparatus that calculates a time taken for a tool to move on a designated tool path according to an NC command, comprising:

a unit that divides the tool path into a plurality of segments;

a speed calculating unit that acquires a speed in a tangential direction of each of the segments;

a segment moving time calculating unit that calculates a time taken for the tool to move on each segment based upon the speed in the tangential direction acquired by the speed calculating unit; and a tool moving time calculating unit that acquires the total of the times taken for the tool to move on the respective segments, calculated by the segment moving time calculating unit, as tool moving time, wherein said calculating unit calculates the speed in the tangential direction of the segment from a starting point to a terminal of the segment, based on a predetermined restriction condition, in which the speed in the tangential direction is expressed by a first-degree equation with respect to time for each sections, regardless of time dependency of the speed in a tangential direction calculated by a numerical controller in actual machining control; and said segment moving time calculating unit calculates the tool moving time by identifying a value obtained by integrating a speed in a tangential direction as a length of the segment.

2. The machining time predicting apparatus according to claim 1, wherein said dividing unit acquires the speed of the tool by multiplying the designated speed according to the NC command by a predetermined coefficient, or a coefficient determined based upon a curvature of the tool path, divides the tool path in a predetermined time interval, supposing that the tool moves with the obtained speed, and specifies each of the divided sections as a segment.

3. The machining time predicting apparatus according to claim 2, wherein the predetermined time interval is variable.

4. The machining time predicting apparatus according to claim 1, wherein said speed calculating unit includes:

a terminal speed calculating unit that determines the speed at the terminal of each segment based on at least one of a speed difference, acceleration difference, and a jerk difference between the adjacent segments, the curvature of the tool path, and the number of the segments used for the calculation of the speed;

a tangential acceleration calculating unit that sets a tangential acceleration in the tangential direction of the segment as the maximum value by which a component in a direction of an axis driven by the NC command does not exceed the maximum acceleration of each axis;

an upper limit speed calculating unit that compares a value obtained by multiplying the designated speed by a predetermined coefficient with a predetermined value based upon the curvature of the tool path so as to decide the upper limit speed of the segment; and a speed curve calculating unit that calculates a speed curve, which is a speed in the tangential direction of the segment, by using the tangential acceleration obtained by the tangential acceleration calculating unit, in such a manner that the speed does not exceed said upper limit speed and the speed at the terminal does not exceed the speed obtained by the terminal speed calculating unit.

5. The machining time predicting apparatus according to claim 4, wherein the speed curve calculating unit selects one of a plurality of speed calculating units prepared beforehand, and calculates the speed curve by the selected calculating unit.

* * * * *